United States Patent
Ou et al.

(10) Patent No.: US 12,207,681 B2
(45) Date of Patent: Jan. 28, 2025

(54) FILTER FOR SMOKING SMOKABLE SUBSTANCES

(71) Applicant: R.Y.L. Inc., Commerce, CA (US)

(72) Inventors: Suk Hwan Ou, Commerce, CA (US); Kyung Kim, Lakewood, CA (US)

(73) Assignee: R.Y.L. INC., Commerce, CA (US)

( * ) Notice: Subject to any disclaimer, the term of this patent is extended or adjusted under 35 U.S.C. 154(b) by 1039 days.

(21) Appl. No.: 17/100,694

(22) Filed: Nov. 20, 2020

(65) Prior Publication Data

US 2021/0352961 A1 Nov. 18, 2021

Related U.S. Application Data

(63) Continuation-in-part of application No. 15/930,155, filed on May 12, 2020, now Pat. No. 11,957,162.

(51) Int. Cl.
*A24F 13/06* (2006.01)
*C03B 11/12* (2006.01)
(Continued)

(52) U.S. Cl.
CPC ............ *A24F 13/06* (2013.01); *C03B 11/122* (2013.01); *C03B 23/049* (2013.01); *C03B 29/02* (2013.01); *C03B 33/095* (2013.01)

(58) Field of Classification Search
CPC .... A24F 1/16; A24F 7/04; A24F 13/04; A24F 13/06

See application file for complete search history.

(56) References Cited

U.S. PATENT DOCUMENTS 1,500,802 A * 7/1924 Chantilis ................. A24F 13/06
                                                    131/215.2
3,236,243 A * 2/1966 Robins .................... A24F 13/04
                                                    131/210
(Continued)

FOREIGN PATENT DOCUMENTS

CN         103431518        12/2013
CN         109152415 A      1/2019
(Continued)

OTHER PUBLICATIONS

Office Action received for Canadian Patent Application No. 3115429, mailed on Jan. 3, 2023, 6 pages.
(Continued)

*Primary Examiner* — Eric Yaary
(74) *Attorney, Agent, or Firm* — WOMBLE BOND DICKINSON (US) LLP (57) ABSTRACT

A tube filter for smoking a smokable substance that includes a receiving section having a receiving chamber dimensioned to receive the substance, a smoke section having a smoke chamber to output smoke produced while the substance is ignited, wherein the smoke section has a first open end into the smoke chamber and the receiving section has a second open end into the receiving chamber that is opposite to the first end, and first, second, and third indentations that are disposed between the two chambers, wherein a portion of the first indentation and a first portion of the second indentation are disposed within a first cross-section of the filter and a portion of the third indentation and a second portion of the second indentation are disposed within a second cross-section of the filter, and the third indentation is entirely disposed above the first indentation along the center longitudinal axis.

9 Claims, 9 Drawing Sheets

(51) Int. Cl.
*C03B 23/049* (2006.01)
*C03B 29/02* (2006.01)
*C03B 33/095* (2006.01)

(56) References Cited

U.S. PATENT DOCUMENTS

| | | | |
|---|---|---|---|
| 3,723,081 | A | 3/1973 | Poulsen |
| 4,044,936 | A | 8/1977 | Obersby et al. |
| 4,461,308 | A * | 7/1984 | Le Cover ............... A24F 13/06 131/198.1 |
| 4,580,584 | A | 4/1986 | Reynolds et al. |
| 4,801,323 | A | 1/1989 | Klein et al. |
| 4,923,498 | A | 5/1990 | Gregory |
| 4,945,929 | A * | 8/1990 | Egilmex ............... A61M 11/002 131/273 |
| 5,178,165 | A | 1/1993 | DeFelice |
| 6,216,493 | B1 | 4/2001 | Weston et al. |
| 2011/0036366 | A1* | 2/2011 | Sebastian ............... A24D 3/08 131/342 |
| 2011/0094524 | A1 | 4/2011 | Glover |
| 2013/0133672 | A1* | 5/2013 | Walsh ............... A24F 1/28 131/216 |
| 2014/0048085 | A1 | 2/2014 | Cox |
| 2015/0020819 | A1 | 1/2015 | Barrett |
| 2016/0235115 | A1* | 8/2016 | Han ............... A24F 1/28 |
| 2017/0208859 | A1 | 7/2017 | Ou |
| 2018/0000152 | A1 | 1/2018 | Ito et al. |
| 2018/0332890 | A1 | 11/2018 | Tweedie |

FOREIGN PATENT DOCUMENTS

| | | |
|---|---|---|
| EP | 2380659 A1 | 10/2011 |
| FR | 0936216 A | 7/1948 |
| FR | 2109761 A5 | 5/1972 |
| GB | 1336465 A | 11/1993 |
| JP | 2017-099286 A | 6/2017 |

OTHER PUBLICATIONS

Purr Glass, "How to Blow Glass Pipes, Bongs, Bubblers, and More by Purr—Part 5", YouTube, Timestamp: (0:16-4:15), https://www.youtube.com/watch?v=I1Es2Xg-A04, Sep. 11, 2018 (Sep. 11, 2018). Copy is unavailable at the specified URL.

European Search Report and Search Opinion received for EP Patent Application No. 21173179.9, mailed on Oct. 22, 2021, 9 pages.

Office Action received for GB Patent Application No. 2106675.8, mailed on Nov. 9, 2021, 12 pages.

Ab Hanna, "Best Glass Tips for Smoking Marijuana", https://greenrushdaily.com/technology/glass-tips-smoking-marijuana/, Aug. 17, 2016.

Bingo's Solutions, "How to roll a joint or a blunt with glass filter tips in 6 simple steps", https://www.bingos-solutions.com/2017/01/27/how-to-roll-a-joint-or-a-blunt-with-glassfilter- tips-in-5-simple-steps/, Jan. 27, 2017.

Examination Search Report of the Canadian Patent Office dated Jul. 21, 2022 for related Canadian Patent Application No. 3115429.

Jeremiah Wilhelm, "Blunt and Joint Tips Are Becoming the Classy Way to Smoke", https://www.leafly.com/news/strains-products/blunt-and-joint-tips-the-classy-way-tosmoke-cannabis, May 30, 2017.

Lowkeylegend, "Stoner Tips #160: Glass Filter Tips", Thumbnail, https://www.youtube.com/watch?v=rpbGpua7dTO, Jan. 6, 2020.

Decision to grant received for European Patent Application No. 21173179.9, mailed on Jun. 6, 2024, 2 pages.

Glass Charlie, "Dynavap Glass Cooling Body", Glass Charlie Vapefiend, Jul. 1, 2019, 5 pages.

Office Action received for Chinese Patent Application No. 202110511175.9, mailed on May 13, 2024, 33 pages (15 pages of English Translation and 18 pages of Original Document).

Office Action received for GB Patent Application No. 2106675.8, mailed on May 14, 2024, 4 pages.

* cited by examiner

FIG. 13b

FILTER FOR SMOKING SMOKABLE SUBSTANCES

FIELD

An embodiment of the disclosure relates to a filter for smoking smokable substances with several indentations. Other embodiments are also described.

BACKGROUND

Various devices exist for smoking substances such as tobacco. The most commonly used device is a cigarette or cigar, which consists of tobacco rolled within a thin paper. The cigarette or cigar is ignited at one end and smoke, which is emitted from the ignited (or smoldering) tobacco, is inhaled or tasted from the other end. In addition to cigarettes, there are tobacco pipes which are designed to hold tobacco in a bowl formed at one end and allow the user to inhale or taste smoke or vapor emitted from the burning or vaporization of the tobacco from another end. In particular, a tobacco pipe typically consists of an upwardly facing bowl for holding the tobacco, a stem (or shank) that extends from the bowl and ends in a mouth piece (the bit). Cigarettes and cigars are disposable, while most tobacco pipes are not.

SUMMARY

Many cigarettes that are smoked are machine-manufactured cigarettes that are produced by commercial brands. These cigarettes may include two parts that are rolled within the thin paper: the tobacco at one end and a cigarette filter at an opposite end. To smoke, the end having the tobacco is ignited to emit smoke. The user puts the end that has the cigarette filter to the user's lips. The user then sucks the smoke being emitted by the tobacco through the cigarette filter and into the user's mouth (and lungs). The smoke is then exhaled and the process is repeated. The cigarette filter serves several purposes. For example, filters may reduce the amount of tobacco residue made by the burning of the tobacco from being inhaled. In addition, filters provide a portion of the cigarette that users may hold while the tobacco is ignited. Also, the filter provides a path through which the smoke travels from the ignited tobacco into the user's mouth. This path may help cool the smoke before it reaches the user's lungs in order to provide a more pleasurable smoking experience.

Some cigarettes, however, may be produced without a cigarette filter. For example, users may not include a cigarette filter when hand-rolling personal cigarettes. These hand-rolled cigarettes may only include the tobacco that is rolled within the thin paper. When hand-rolling cigarettes, rather than include a filter, some users may pinch off or twist the end of the cigarette from which the user will inhale the smoke. Although this will allow the user to smoke, it lacks the benefits of having a filter, such as preventing tobacco residue from entering the user's mouth (and lungs). Therefore, there is a need for a filter with which a user may smoke a smokable substance.

The instant disclosure is directed to a filter for smoking smokable substances that has several indentations. For example, the filter may include three indentations that are disposed between a (e.g., receiving section that has a) receiving chamber that is dimensioned to receive a smokable substance and a (e.g., smoke section that has a) smoke chamber to output smoke produced while the smokable substance is ignited. A portion of a first indentation and a first portion of a second indentation are disposed within a first cross-section of the filter, and a portion of a third indentation and a second portion of the second indentation are disposed within a second cross-section of the filter. Also, the third indentation is entirely disposed above the first indentation along a center longitudinal (Z-) axis. The manufactured filter provides the user with a reusable filter that may be used to smoke smokable substances. For example, the user may insert a hand-rolled cigarette (e.g., that does not include a filter) into the receiving chamber, and the user may inhale smoke from the smoking chamber. The indentations may filter the smoke (e.g., filter tobacco residue) before it enters the smoking chamber.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment of the disclosure, and not all elements in the figure may be required for a given embodiment.

DETAILED DESCRIPTION

Several embodiments of the disclosure with reference to the appended drawings are now explained. Whenever the shapes, relative positions and other aspects of the parts described in the embodiments are not explicitly defined, the scope of the disclosure is not limited only to the parts shown, which are meant merely for the purpose of illustration. Also, while numerous details are set forth, it is understood that some embodiments of the disclosure may be practiced without these details. In other instances, structures and techniques have not been shown in detail so as not to obscure the understanding of this description. Furthermore, unless the meaning is clearly to the contrary, all ranges set forth herein are deemed to be inclusive of the endpoints. In addition, the terms "over", "to", and "on" as used herein may refer to a relative position of one feature with respect to other features. One feature "over" or "on" another feature or bonded "to" another feature may be directly in contact with the other feature or may have one or more intervening layers. In addition, the use of relative terms throughout the description, such as "top", "above or "upper" and "bottom", "under" or "lower" may denote a relative position or direction. For example, a "top edge", "top end" or "top side" may be directed in a first axial direction and a "bottom edge", "bottom end" or "bottom side" may be directed in a second direction opposite to the first axial direction.

According to one embodiment, a tube filter for smoking a smokable substance includes a receiving section having a receiving chamber dimensioned to receive the smokable substance, a smoke section having a smoke chamber to output smoke produced while the smokable substance is ignited, where the smoke section has a first open end into the smoke chamber and the receiving section has a second open end into the receiving chamber that is opposite to the first end, and a first indentation, a second indentation, and a third indentation that are disposed between the receiving chamber and the smoke chamber, where a portion of the first indentation and a first portion of the second indentation are disposed within a first cross-section of the tube filter and a portion of the third indentation and a second portion of the second indentation are disposed within a second cross-section of the tube filter, and the third indentation is entirely disposed above the first indentation along the center longitudinal axis.

In one embodiment, the first indentation and the second indentation form a first path inside the tube filter and the second indentation and the third indentation form a second path inside the tube filter, where the first and second paths fluidly couple the receiving chamber to the smoke chamber. In another embodiment, the first, second, and third indentations are equidistant along the center longitudinal axis. In some embodiments, the first indentation is radially aligned with the third indentation along the center longitudinal axis. In one embodiment, the first and second cross-sections are separate and adjacent to one another, and have a same length along the center longitudinal axis.

In one embodiment, the first and third indentations are radially separated from the second indentation about the center longitudinal axis by 180°. In another embodiment, the tube filter is composed of at least one of metal and glass. In some embodiments, the tube filter has a diameter from 4 mm to 18 mm. In one embodiment, the first open end and the second open end both have an inner diameter from 3 mm to 12 mm. In another embodiment, the tube filter has a length from the first open end to the second open end that extends along the center longitudinal axis from 12 mm to 120 mm.

According to another embodiment, a tube filter for smoking a smokable substance includes a receiving section having a receiving chamber dimensioned to receive the smokable substance, a smoke section having a smoke chamber to output smoke produced while the smokable substance is ignited, wherein the smoke section has a first open end into the smoke chamber and the receiving section has a second open end into the receiving chamber that is opposite to the first end, and an indentation section that is disposed between the receiving section and the smoke section and fluidly couples the receiving section to the smoke section, where the indentation section includes a first indentation, a second indentation, and a third indentation that are entirely aligned along a transverse plane to a center longitudinal axis of the tube filter.

In one embodiment, the first, second, and third indentations are equidistant along a circumference of the tube filter. In some embodiments, each of the indentations are concave portions of a wall of the tube filter. In another embodiment, each of the concave portions have a same size. In one embodiment, at least one of the concave portions is a different size than a size of another one of the concave portions.

In another embodiment, the indentation section includes a hollow interior that is formed by the first, second, and third indentations. In one embodiment, the center longitudinal axis intersects the hollow interior such that no portion of the first, second, or third indentations are intersected by the center longitudinal axis. In some embodiments, the tube filter is composed of at least one of metal and glass. In one embodiment, the smoke section has a first length that extends along the center longitudinal axis and the receiving section has a second length that extends along the center longitudinal axis, wherein the first length is less than the second length. In another embodiment, the receiving section tapers inward along the center longitudinal axis.

Figure 1:
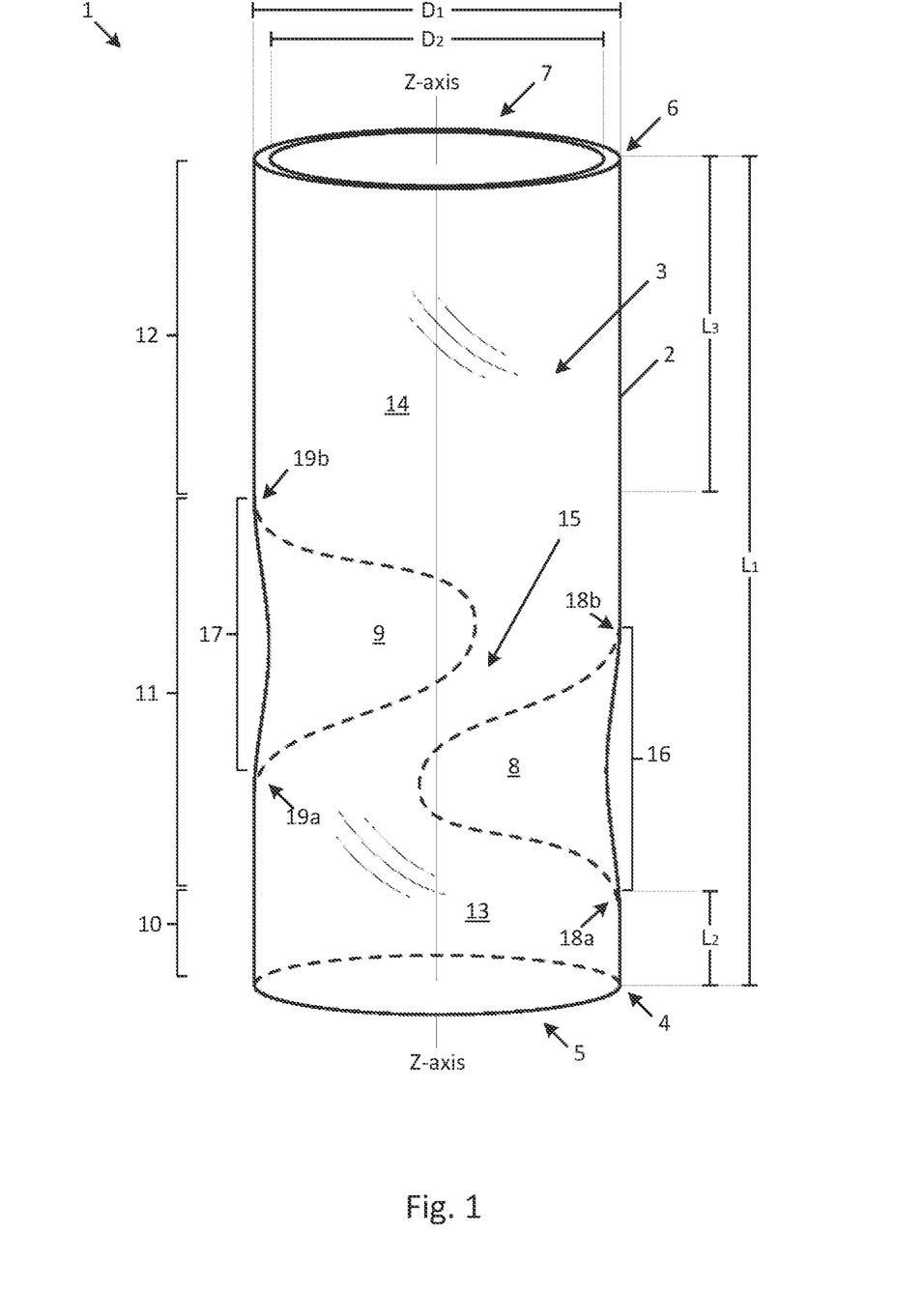
FIG. 1 shows a filter for smoking smokable substances according to an embodiment of the present disclosure.

FIG. 1 shows a filter for smoking smokable substances according to an embodiment of the present disclosure. Specifically, this figure illustrates a filter 1 that may be a tube (or have a substantially tubular shape) that includes a (substantially) cylindrical wall 2 with a hollow interior 3. In one embodiment, the filter may be any shape, such as cubic-shaped, cone-shaped, or sphere-shaped. The filter may be composed of at least one material, such as glass, plastic, and a metal (e.g., steel). In one embodiment, the filter may be entirely composed of a single material, such as glass.

The filter 1 includes a first (open) end 4 with a first opening 5 that opens into the hollow interior 3, and a second (open) end 6 with a second opening 7 that opens into the hollow interior. In one embodiment, the first open end 4 is opposite to the second open end 6. Thus, the hollow interior 3 fluidly couples opening 5 to (with) opening 7. The filter 1 has a first (outer) diameter ($D_1$) that is the outermost diameter of the cylindrical wall 2, and a second (inner) diameter ($D_2$) that is the diameter of (at least a portion of) the hollow interior 3. In one embodiment, $D_1$ may be from about 4 mm to 18 mm. In another embodiment, $D_2$ may be from about 3 mm to 17 mm. In one embodiment, $D_2$ may be based on a thickness of the cylindrical wall 2, which may be from about 0.5 mm to 2 mm. In one embodiment, $D_2$ may be less than $D_1$ by at least double the thickness of the cylindrical wall. In another embodiment, the filter has a length ($L_1$) that extends from the first end 4 to the second end 6 along a center longitudinal axis (e.g., Z-axis) that may be from about 12 mm to 120 mm. In one embodiment, the dimensions of the filter 1 may vary, as described herein.

In one embodiment, the first end 4 and second end 6 of the filter 1 may have similar dimensions. For example, the first end 4 and the second end 6 may have a diameter of $D_1$, while their respective openings have a diameter of $D_2$. In another embodiment, the diameters of the ends may be different. For example, the outer diameter of the first end 4 may be greater than the outer diameter of the second end 6.

The filter 1 includes several sections. Specifically, the filter includes a first (e.g., smoke) section 10, an indentation section 11, and a second (e.g., receiving) section 12. As shown, the indentation section is disposed (or positioned) between the smoke section and the receiving section. Specifically, the smoke section includes the first open end 4 and is adjacent to the indentation section. The receiving section includes the second open end 6 and is adjacent to the indentation section, opposite to the smoke section. The receiving section also includes a receiving chamber 14 that is formed inside the hollow interior 3 and is for receiving (through the second open end 6) a smokable substance, such as tobacco. In particular, the open end 6 is fluidly coupled to the receiving chamber, where both may be dimensioned (e.g., have a diameter of $D_2$) to receive the smokable substance, such as a (e.g., personally-rolled) cigarette. Similarly, the smoke section also includes a smoke chamber 13 that is formed inside the hollow interior 3 and is for receiving smoke emitted from an ignited smokable substance that has been received by the receiving chamber 14. For example, a user may insert the personally-rolled cigarette into the receiving chamber and ignited it. The open end 4 is fluidly coupled to the smoke chamber, where both are for outputting the smoke produced while the smokable substance is ignited. Specifically, the smoke chamber may be configured to receive the smoke (e.g., from the receiving chamber) and the open end 4 is for outputting the smoke, such as when the user inhales.

In one embodiment, the receiving section 12 and the smoke section 10 may each have a substantially tubular shape along the filter's Z-axis. For instance, the receiving section may have a same (or similar) outer diameter, such as $D_1$, and inner diameter (e.g., the diameter of the receiving chamber), such as $D_2$, throughout a length ($L_3$) of the receiving section that extends along the Z-axis from the second open end 6 to the indentation section 11. Similarly, the smoke section may have a same (or similar) outer diameter, such as $D_1$, and inner diameter (e.g., the diameter of the smoke chamber), such as $D_2$, throughout a length ($L_2$) of the smoke section that extends along the Z-axis from the first open end 4 to the indentation section. In one embodiment, the sections respective chambers have a same or similar length as the sections. For example, the receiving chamber 14 has a same or similar length $L_3$ as the receiving section.

In one embodiment, the receiving section 12 and the smoke section 10 may have different dimensions. For example, as illustrated, $L_3$ of the receiving section (and the receiving chamber) that extends along the Z-axis is greater than $L_2$ of the smoke section (and the smoke chamber) that extends along the same axis. As a result, the indentation section 11 may not be centered along $L_1$ of the filter 1. For instance, the indentation section 11 is disposed closer to the first open end 4 than the second open end 6 of the filter 1 (along the Z-axis). Specifically, a distance between the indentation section 11 and the smoke section 10 is less than a threshold distance. In another embodiment, $L_2$ may be greater than $L_3$.

The indentation section 11 includes a first indentation 8 and a second indentation 9 that extend along a portion of the filter 1 in the Z-direction, and both of which separate the receiving chamber 14 from the smoke chamber 13. The first indentation 8 is formed from a first concave portion 16 of the cylindrical wall 2 of the filter 1, and the second indentation 9 is formed from a second concave portion 17 of the cylindrical wall 2 of the filter 1. Specifically, the concave portions are portions of the cylindrical wall 2 that concave into the hollow interior, thereby reducing the inner diameter ($D_2$) of the hollow interior. In one embodiment, the concave portions may also reduce the outer diameter ($D_1$) of the filter 1.

As illustrated, the concave portions 16 and 17 extend along different sections of the filter 1 in the Z-direction. For example, the first concave portion 16 begins to concave at a point 18a of the cylindrical wall 2 and ceases to concave at 18b. Similarly, the second concave portion 17 begins to concave at a point 19a of the cylindrical wall 2 and ceases to concave at 19b. Thus, the first concave portion 16 begins to concave (along the Z-direction) before the second concave portion and ceases to concave before the second concave portion 17 ceases. Thus, as shown, each of the concave portions are at least partially disposed (or overlap) within a cross-section of the filter 1. Specifically, a partial cross-section of the indentation section 11 (e.g., having a length between 19a and 18b in the Z-direction) includes at least some of both of the first concave portion 16 and the second concave portion 17. In one embodiment, this cross-section may include equal (or symmetric) portions of the concave portions 16 and 17. For instance, point 19a may be on a transverse plane to the Z-axis that intersects a midpoint of the concave portion 8 (e.g., a midpoint between 18a and 18b). Similarly, point 18b may be on a transverse plane to the Z-axis that intersects a midpoint of the concave portion 9 (e.g., a midpoint between 19a and 19b). In another aspect, at least some of the concave portions 16 and 17 may not overlap with each other. For example, at least one other partial cross-section of the indentation section 11 only includes one of the first concave portion 16 and the second concave portion 17 (e.g., between 18a and 19a and between 18b and 19b). In one embodiment, both indentations are portions of the cylindrical wall that concave into the hollow interior 3, without fluidly coupling the hollow interior to an outside environment of the filter. In addition, both indentations cross through (or intersect) the center longitudinal Z-axis of the filter at least two times.

In one embodiment, the indentation section 11 is arranged to fluidly couple the receiving section 12 to the smoke section 10. In particular, the first indentation 8 and the second indentation 9 are concave portions of the cylindrical wall 2 that form a path 15 inside the filter 1 that fluidly couples the receiving chamber 14 of the receiving section 12 to the smoke chamber 13 of the smoke section 10. In one embodiment, this path 15 has a lesser diameter than the diameter of either chamber (e.g., $D_2$). This path 15 also runs diagonally through the center longitudinal Z-axis of the filter.

In one embodiment, the filter 1 may include less or more components as described herein. For example, in one variation the filter 1 may only include one indentation (e.g., the first indentation 8), while in another variation the filter 1 may include three or more indentations. As another example, the filter may include three or more chambers inside the hollow interior 3. For instance, the filter may include a chamber that separates the first indentation 8 from the second indentation 9.

As described herein, the dimensions of the filter 1 may vary. Specifically, diameters (e.g., $D_1$ and/or $D_2$) may vary between one or more of the sections. For example, the receiving section 12 may taper inward toward and along the Z-axis, such that a portion (e.g., cross-section) of the receiving section closest to the indentation section 11 may have a first diameter (e.g., $D_2$), while the first end 4 of the filter may have a second diameter that is smaller than the first diameter. In another embodiment, the smoke section 10 may taper along the Z-axis.

FIGS. 2-9 illustrate a process for manufacturing the filter according to one embodiment of the present disclosure. Specifically, these figures illustrate a process performed by a single machine or multiple machines to manufacture filter 1 (illustrated in FIG. 1) from a tube 20.

Figure 2:
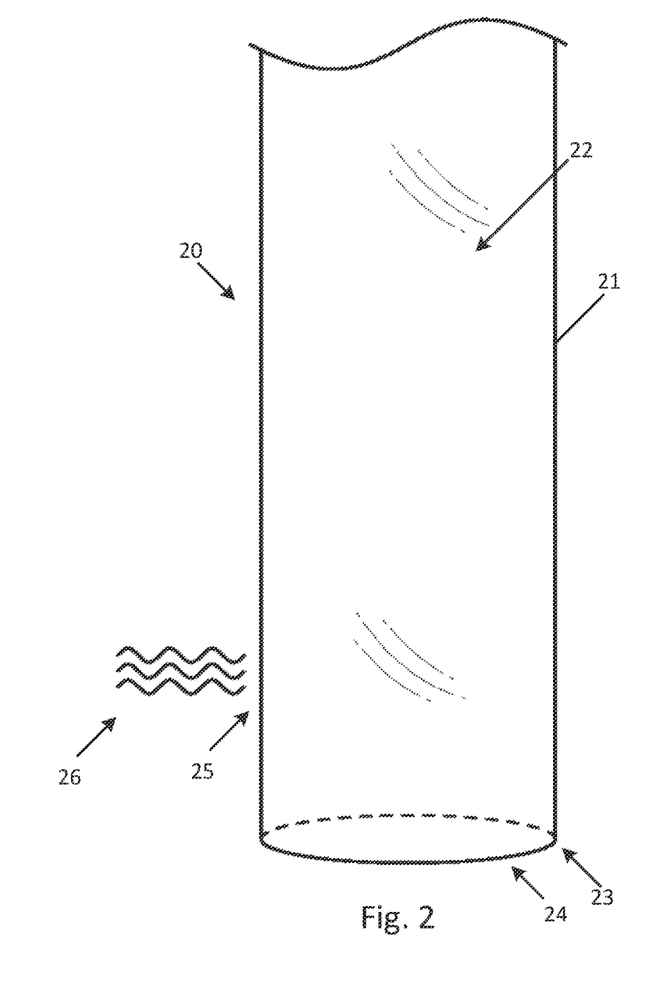
FIGS. 2-9 illustrate a process for manufacturing the filter according to one embodiment of the present disclosure.
Figure 3:
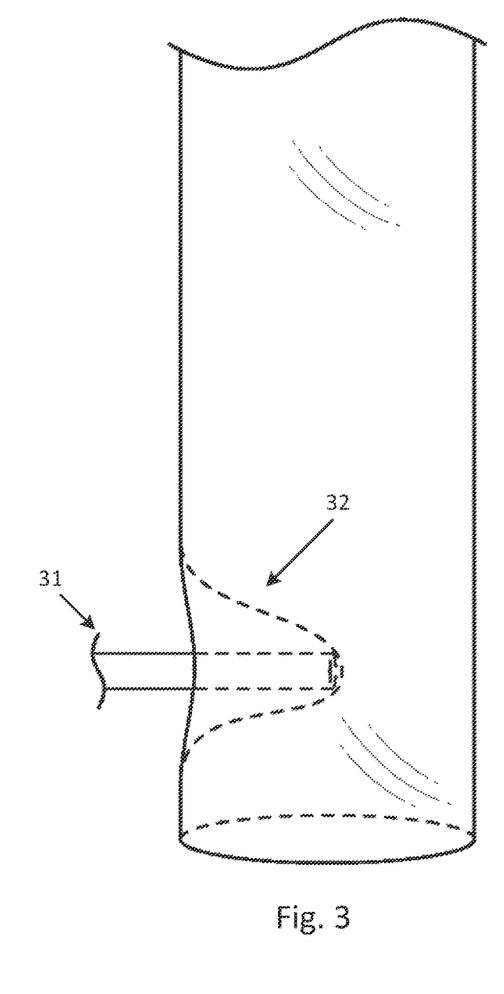

FIGS. 2 and 3 illustrate the formation of a first indentation 32. Specifically, FIG. 2 shows heat 26 being applied to a tube 20 that has a cylindrical wall 21 and a hollow interior 22. The tube 20 also as a (first open) end 23 with a (first) opening 24. As illustrated herein, heat 26 is being applied to a (first) portion of the cylindrical wall 21 of the tube 20. In one embodiment, the heat is applied to the first portion of the cylindrical wall 21 for a first period of time (e.g., four seconds). In another embodiment, the heat 26 may be applied for a period of time such that the first portion of the cylindrical wall 21 becomes amenable. In some embodiments, the heat may be a flame from a blow torch, such as a propane blow torch or a natural gas torch. FIG. 3 illustrates the tube 20 of FIG. 2 after the heat 26 is applied to the portion of the cylindrical wall. Specifically, this figure illustrates that a tool 31 is applying an inward pressure to the portion 25 of the cylindrical wall at which the heat was applied to collapse the cylindrical wall 21 into the hollow interior 22. In one embodiment, the tool 31 is a metal rod or plunger. In one embodiment, the tool 31 is a drill bit. In another embodiment, the tool 31 may apply the inward pressure a second period of time after the heat 26 was applied (e.g., two seconds). The result of the applied pressure is the formation of a first indentation 32.

Figure 4:
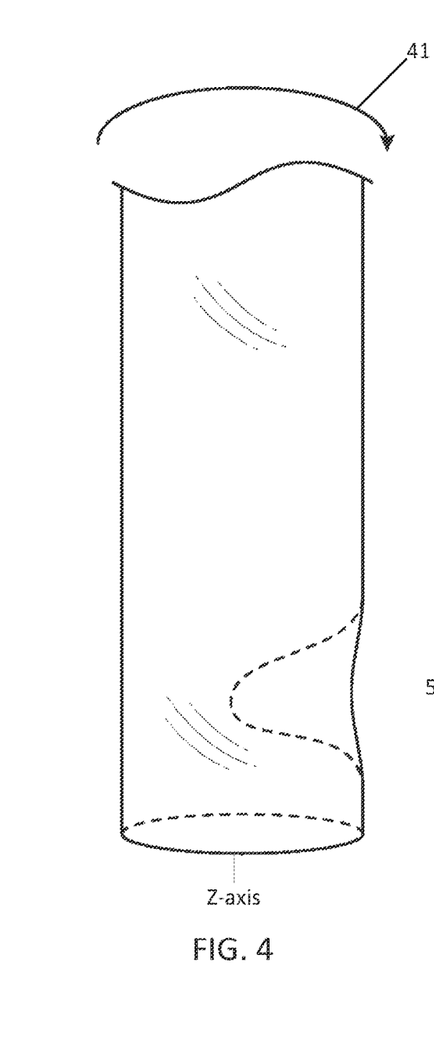

FIG. 4 illustrates the tube 20 of FIG. 3 after the first indentation 32 is formed. Specifically, this figure illustrates that the tube 20 is rotated 41 about a longitudinal Z-axis running through a center of the tube 20. In one embodiment, the tube 20 is rotated by a predetermined threshold. For example, the tube 20 may be rotated 41 about the Z-axis by 180°. This is illustrated by the first indentation 32 being located to the right of the tube 20, rather than being located to the left of the tube 20, as illustrated in FIG. 3. In one embodiment, the tube 20 may be rotated less or more than 180°, such as 135°.

Figure 5:
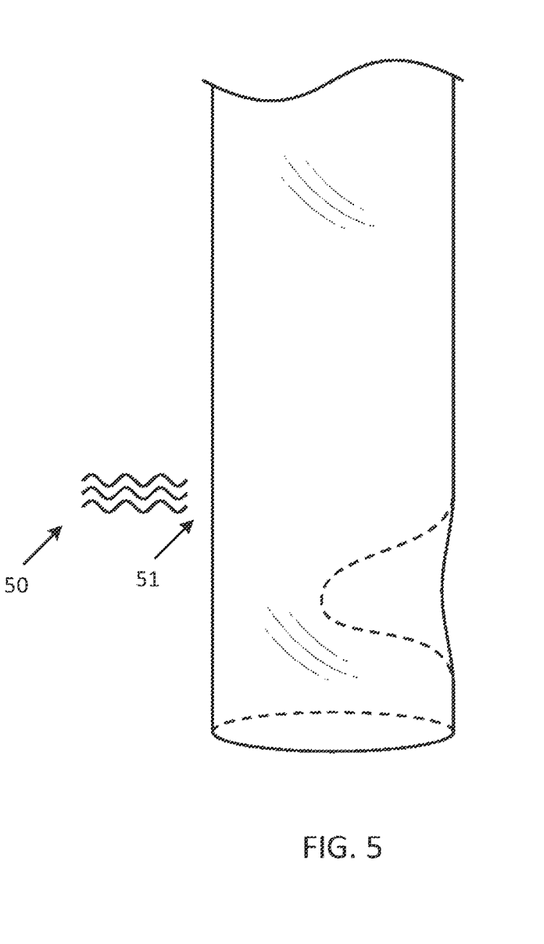
Figure 6:
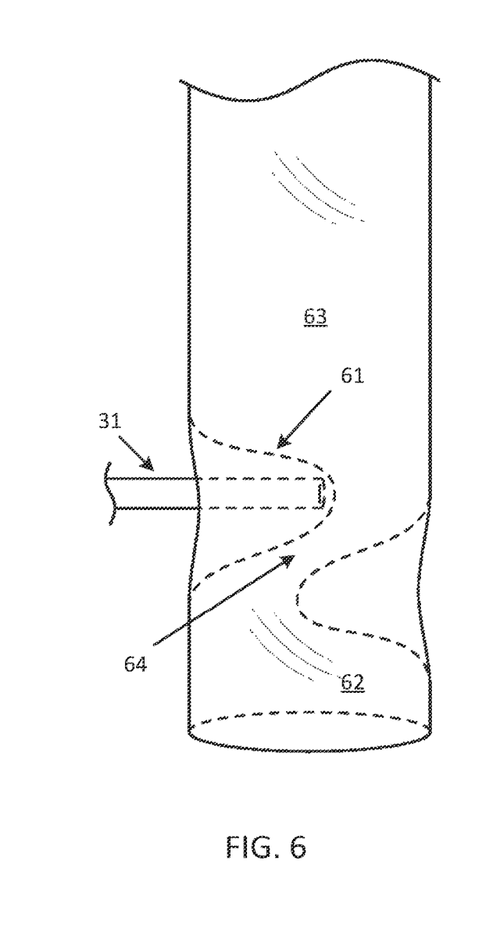

FIGS. 5 and 6 illustrate the formation of a second indentation 61. Specifically, FIG. 5 shows the tube 20 of FIG. 4, after the tube is rotated 41. In particular, this figure illustrates that heat 50 is being applied to a (second) portion 51 of the tube 20. As illustrated, the heat 50 is applied at a different point along the Z-axis than the heat 26. Specifically, the second portion 51 at which the heat 50 is applied is higher along the Z-axis (from the end 23) than the first portion 25 at which the heat 26 is applied. As a result, the first and second portions at least partially overlap one another or are at least partially contained within a cross section of the tube 20. Also, since the tube 20 is rotated 41, the second portion 51 is radially separated from the first portion 25 by the predetermined threshold at which the tube was rotated (e.g., 180°). In one embodiment, the applied heat 50 is the same heat 26 that is applied in FIG. 2. For instance, the temperature of heat 26 (and/or duration) may be the same as heat 50. In another embodiment, heat 50 is different than heat 26. In one embodiment, the heat 50 may be applied a third period of time after the first indentation is formed in order to allow the tube to (slightly) cool. For example, the third period of time may be thirty seconds between the formation of the first indentation and a time at which the heat 50 is first applied. FIG. 6 illustrate the tube 20 of FIG. 5, after the heat 50 is applied. Specifically, this figure illustrates that the tool 31 is applying an inward pressure to the portion 51 of the cylindrical wall at which the heat was applied to collapse the cylindrical wall 21 into the hollow interior 22. The result of the applied pressure is the formation of a second indentation 61, which is therefore formed after the tube 20 has rotated about the longitudinal Z-axis, as illustrated in FIG. 4. Thus, the first indentation 32 and the second indentation 61 create 1) a first chamber 62 and a second chamber 63 in the tube 20 that are separated by both indentations and 2) a path 64 within the hollow interior 22 formed between the first and second indentations that fluidly couples both chambers together. Since the second indentation is formed after the rotation of the tube 20, the first indentation is radially separated from the second indentation about the center longitudinal axis by the predetermined threshold (e.g., 180°). In one embodiment, a same pressure is applied to the second portion 51 as the pressure that is applied to the first portion 25. As a result, the first and second indentations may have a same concave structure. In another embodiment, different pressures may be applied to the first and second portions, which may result in different concave structures for the first and second indentations. In some embodiments a different tool may be used to form the second indentation 61.

Figure 7:
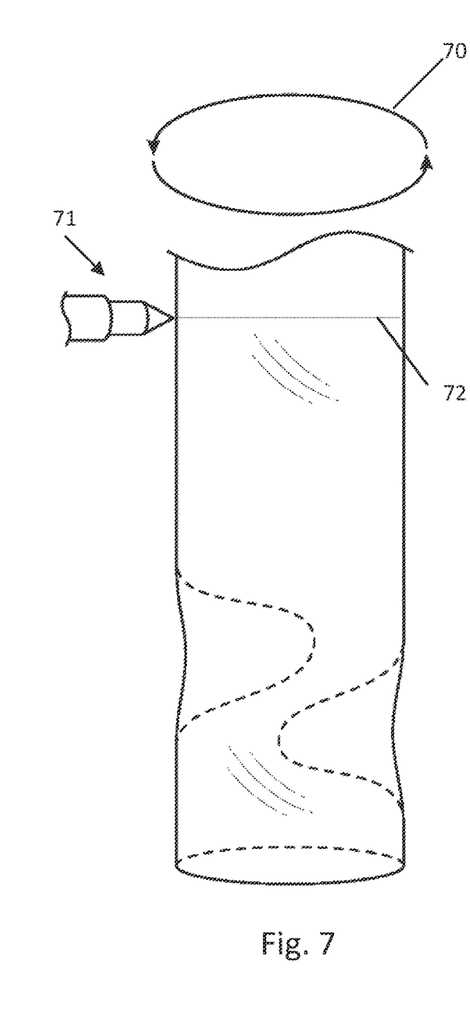
Figure 8:
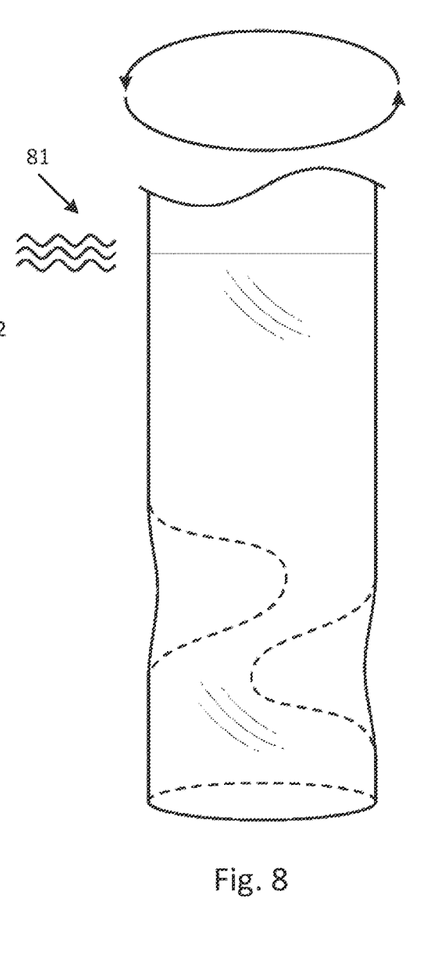
Figure 9:
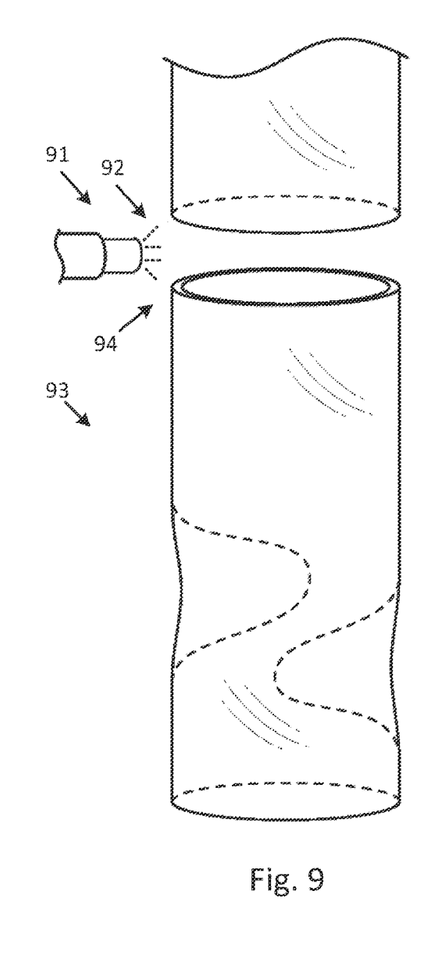

FIGS. 7-9 illustrate the separation of a tube filter from the tube 20 illustrated in FIG. 6, after the second indentation 61 is formed. Specifically, FIG. 7 shows a scoring tool 71 scoring (or cutting) the tube 20 while the tube is rotating 70, thereby creating a scored mark 73 that runs along a circumference of the tube 20. In one embodiment, the scoring tool 71 is a scoring wheel. In another embodiment, the scoring tool may be any tool that is arranged to score glass.

FIG. 8 shows that heat 81 is being applied to the score mark 72, while the tube rotates. As described herein, the heat 81 may be the same (similar) or different than at least one of the other heats (e.g., heat 26 and 51) that are applied to the tube 20. For instance, the heat 81 may be applied for a fourth period of time (e.g., four seconds). As described herein, the heat 81 is applied while the tube 20 rotates. In one embodiment, the tube 20 may be rotated at a similar speed as when the tube was scored (as described in FIG. 7), or the heat may be applied while the tube is rotating at a different speed. In one embodiment, the tube 20 is being rotated in order to apply the heat 81 evenly along the scored mark.

FIG. 9 shows the tube 20 being cut due to thermal shock. Specifically, this figure shows a spray nozzle 91 that is spraying a liquid 92 (e.g., water) upon the heated score mark 72. The sprayed liquid thermally shocks the tube 20, causing a portion 93 of the tube to separate from (a remainder of) the tube 20. This portion 93 is a filter, which includes the first indentation 32 and the second indentation 61, as described herein. In one embodiment, the filter 93 may be separated (or cut) while the tube 20 continues to rotate. In another embodiment, the filter 93 is the same as filter 1 illustrated in FIG. 1.

In one embodiment, the tube 20 may be allowed to cool after the formation of the second indentation 61. Specifically, the heat 81 may be applied after a sixth period of time (e.g., one minute) from which the second indentation 61 is formed.

Figure 10:
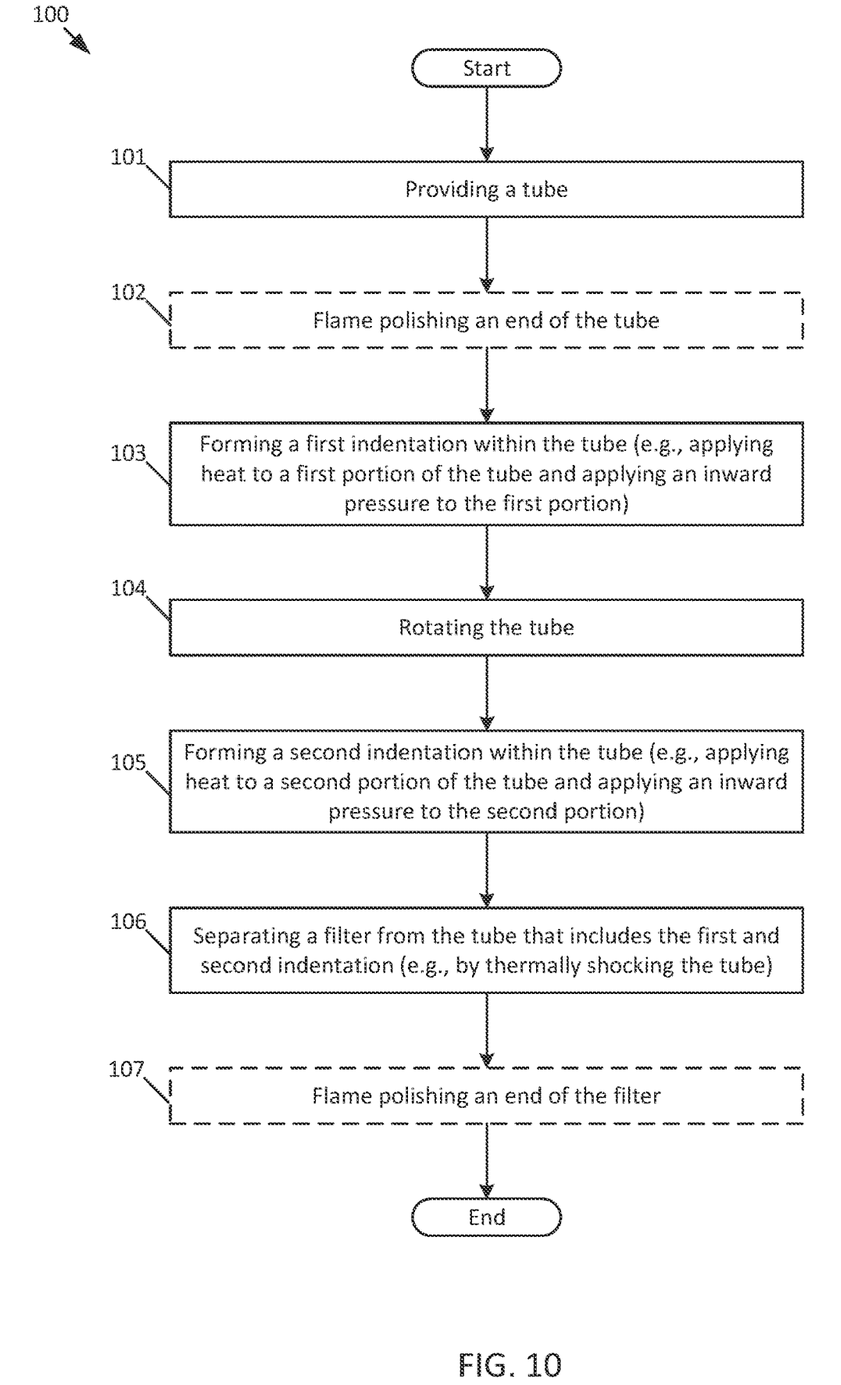
FIG. 10 is a flowchart of one embodiment of the process for manufacturing the filter.

FIG. 10 is a flowchart of one embodiment of a process 100 for manufacturing a filter (e.g., filter 1 of FIG. 1 and/or filter 93 of FIG. 9). This figure will be described with reference to FIGS. 1-9. The process 100 begins by providing a tube, such as tube 20 that includes a cylindrical wall 21 and a hollow interior 22 (at block 101). The process 100 flame polishes an end of the tube (at block 102). For example, the end 23 of tube 20 is flame polished. In one embodiment, the end 23 may be flame polished before any indentations are formed within the tube 20. In another embodiment, the end may be flame polished after at least one indentation is formed. In some embodiments, flame polishing includes applying a heat to the end, while the tube 20 is rotating. In one embodiment, this process may be performed one or more times. For example, heat may be applied while the tube 20 is rotating for a period of time (e.g., five seconds). In one embodiment, the heat may be applied by a flame (produced by a torch), while the tube is rotating. The heat may then be removed for a period of time (e.g., two seconds). Then, heat may be again applied while the tube 20 is rotating for a third period of time (e.g., five seconds). In one embodiment, the second application of heat may be hotter (e.g., having a higher temperature) than the heat of the first application. In one embodiment, the period of times may be the same or different. As a result of the flame polishing, a raised lip that extends around a circumference of the filter 1 and may be formed at the end 23 of the tube 20, which may have an outer diameter that is greater than an outer diameter of (the cylindrical wall 21 of) the tube 20.

The process 100 forms a first indentation within the tube 20 in which a first portion of the cylindrical wall concaves into the hollow interior. Specifically, the first indentation is formed by applying heat to the first portion of the tube and applying an inward pressure to the first portion (at block 103). The process 100 rotates the tube 20 (at block 104). The process 100 forms a second indentation within the tube 20 in which a second portion of the cylindrical wall concaves into the hollow interior. In particular, the second indentation is formed by applying heat to the second portion of the tube and applying an inward pressure to the second portion (at block 105). The process 106 separates the filter (e.g., 93) from the tube 20 that includes the first and second indentations by scoring the tube to produce a scored mark on the tube, applying heat upon the scored mark, and then thermally shocking the tube by spraying water upon the heated scored mark, which causes the filter to separate from the tube (at block 106). The process 100 flame polishes an end of the filter (block 107). For example, as illustrated in FIG. 9, the filter 93 has an end 94 that was attached to tube 20, before the tube was thermally shocked, thereby cutting off the filter. In one embodiment, this end 94 may be flame polished in a similar fashion to the end 23 as described in block 102.

Some embodiments perform variations of the process 100 described in FIG. 10. For example, the specific operations of at least some of the processes may not be performed in the exact order shown and described. The specific operations may not be performed in one continuous series of operations and different specific operations may be performed in different embodiments. For instance, the first and second indentations may be performed in any order (e.g., the first indentation being performed before the second indentation or vice a versa). In some embodiments, at least some of the operations described herein are optional. For example, the operations contained in dashed blocks (e.g., blocks 102 and 107) may not be performed.

Figure 11:
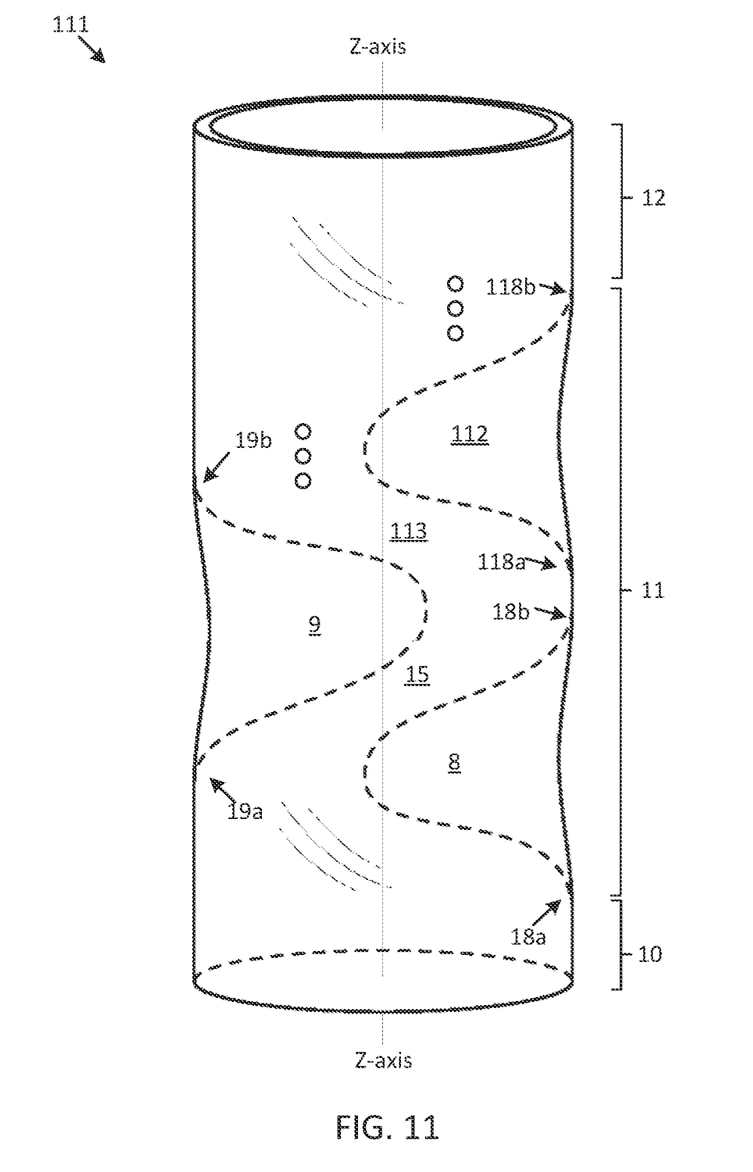
FIG. 11 shows another filter for smoking smokable substances that includes three or more indentations along a center longitudinal axis according to an embodiment of the present disclosure.

FIG. 11 shows another filter 111 for smoking smokable substances that includes three or more indentations along a center longitudinal axis according to an embodiment of the present disclosure. The filter 111 is similar to filter 1 illustrated in FIG. 1. For instance, the filter 111 includes the smoke section 10, the indentation section 11, and the receiving section 12. Filter 111 also includes three (or more) indentations, each of which being a concave portion of the wall of the filter that extends along a portion of the tube in the Z-direction. As shown, each of the indentations at least partially overlaps one or more other indentations along a same section or length of the filter 111. Specifically, a first cross-section of the filter 111 having a length between 19a and 18b in the Z-direction includes a portion of the first indentation and a (first) portion of the second indentation 9, and a second cross-section of the filter 111 having a length between 118a and 19b in the Z-direction includes a portion of the third indentation 112 and another (second) portion of the second indentation 9. In one embodiment, the cross-sections are separate and adjacent to one another, and have a same length along the Z-axis, such that a length (or distance) between 19a and 18b is the same as the length between 118a and 19b. In another embodiment, points 18b and 118a may be the same point. In another embodiment, both of the cross-sections may include equal (or symmetric) portions of respective indentations contained therein.

In one embodiment, at least some of the indentations may be radially aligned with one another. In particular, the first indentation 8 may be radially aligned with the third indentation 112 along the Z-axis. For instance, when forming the third indentation, a portion of the tube 20 where heat and pressure are applied may be vertically aligned (along the Z-axis) with the portion 25, as shown in FIGS. 2 and 3. In some embodiments, the indentations may be radially separated as described herein. For example, the first and third indentations are radially separated from the second indentation 9 about the Z-axis by 180°, as shown. Specifically, once each indentation is formed, the filter may be rotated by 180° to then form a next indentation. In another embodiment, the indentations may be radially separated differently. For example, the indentations may be separated in a spiral fashion about the Z-axis, such as the first indentation being at 0°, the second indentation being at 90°, and the third indentation being at 180°.

As shown, three or more indentations may be positioned along the Z-axis. For instance, the third indentation 112 is entirely disposed above the first indentation along the Z-axis. In one embodiment, each of the three indentations may be equidistant along the Z-axis. In one embodiment, distances (in the Z-direction) between midpoints of adjacent indentations may be the same (or similar). For example, a distance between a midpoint of the first indentation (e.g., between 18a and 18b) and a midpoint of the second indentation (e.g., between 19a and 19b) may be the same as a distance between the midpoint of the second indentation and a midpoint of the third indentation (e.g., between 118a and 118b).

In one embodiment, the addition of indentations also creates additional paths within the hollow interior of the filter that fluidly couple sections 10 and 12 together in order to allow smoke to travel between the sections. As shown, the first and second indentations form the path 15, and the second and third indentations form path 113. Both paths fluidly couple the chambers of sections 10 and 12 together, as described herein. In one embodiment, the paths may be similar (or the same). For instance, the shape and/or size of the paths may be the same. In another embodiment, the paths may be different (e.g., sized differently), which may be based on different sized indentations.

As shown, the filter 111 includes an odd number of indentations. In some embodiments, the filter may include an even number of indentations. In which case, a fourth indentations may be disposed entirely above the second indentation 9 (along the Z-axis), and/or may be aligned with the second indentation.

Figure 12:
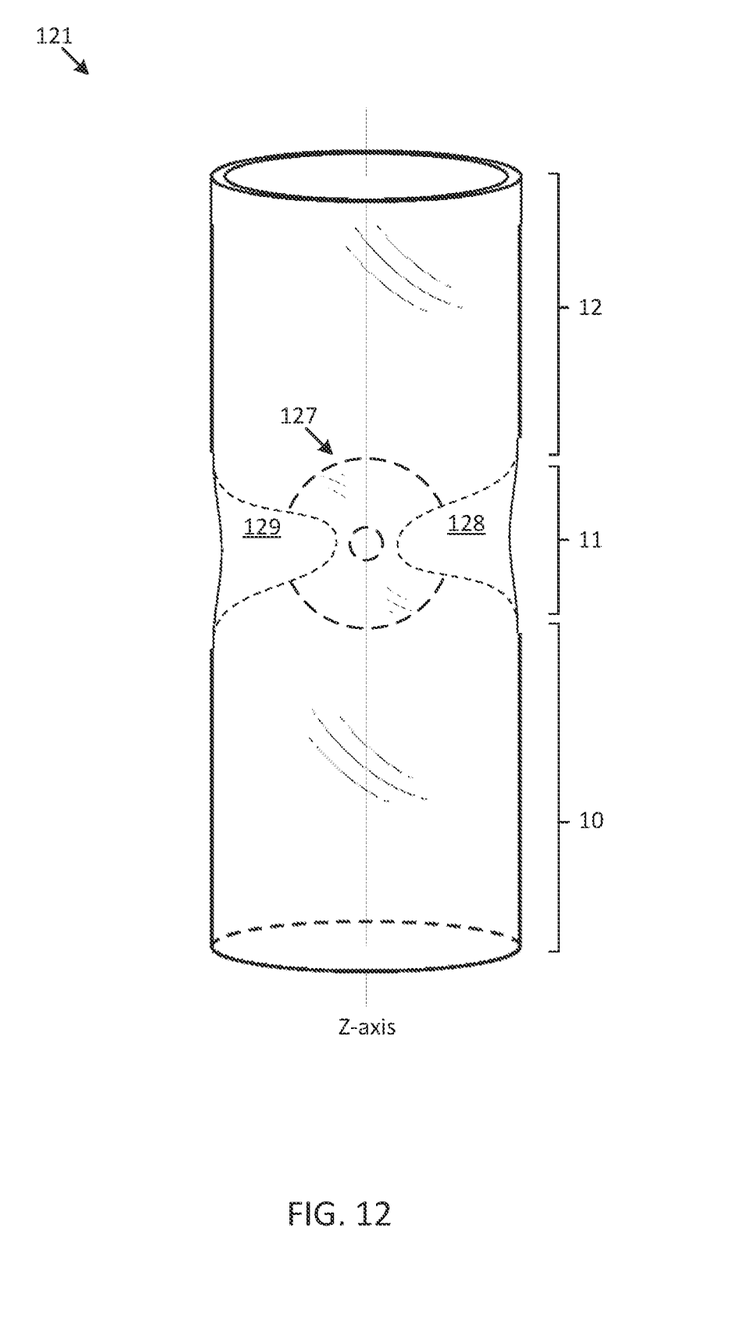
FIG. 12 shows another filter for smoking smokable substances that includes several indentations according to another embodiment of the present disclosure.

FIG. 12 shows another filter for smoking smokable substances that includes several indentations according to another embodiment of the present disclosure. This figure illustrates filter 121 that includes three indentations, 127, 128, and 129 that are entirely aligned along a transverse plane to the Z-axis. Specifically, the concave portions of each of the indentations are extend along a same (or similar) length or section of the filter 121. For example, a cross-section of the (e.g., entire) indentation section 11 includes each of the three indentations along the entire length of the cross-section. This is in contrast to the indentation section of FIG. 1, in which a cross section between 18b and 19b includes a portion of indentation 9 but not a portion of indentation 8. In one embodiment, the indentations are entirely aligned such that no cross-section of either the receiving section 12 or the smoke section 10 includes any portion of the indentations. In another embodiment, a portion of a cross-section of the receiving section and/or the smoke section may include portions of all three indentations.

In another embodiment, the concave portions of each of the inventions may have a same size and/or shape. In another embodiment, the concave portions may be different in size and/or shape. In particular, a size and/or shape of one indentation may be different than a size and/or shape of another indentation. For example, a size of the indentation 129, such as a length of the indentation extending from a side of the filter's wall to the Z-axis, may be different than a length of the indentation 128.

Figure 13A:
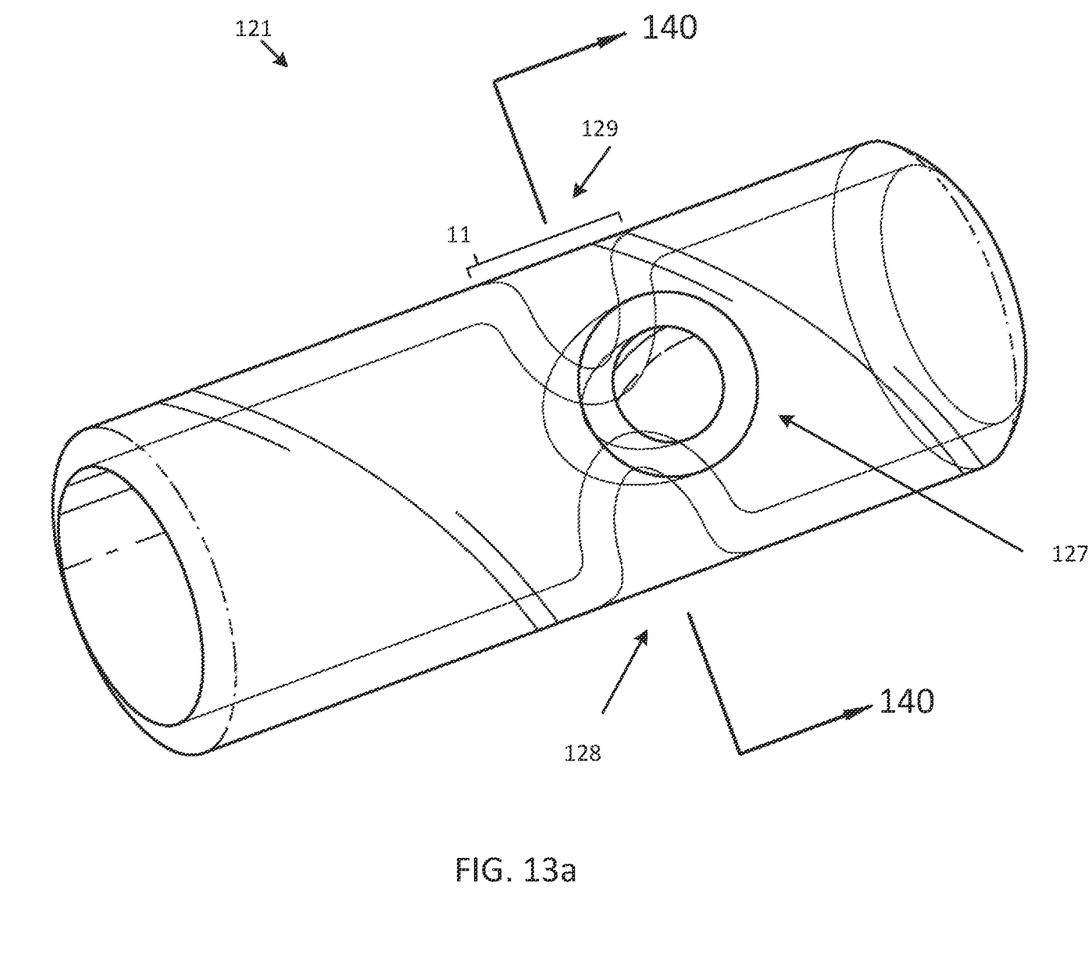
FIG. 13*a* shows a perspective view of the filter shown in FIG. 12.
Figure 13B:
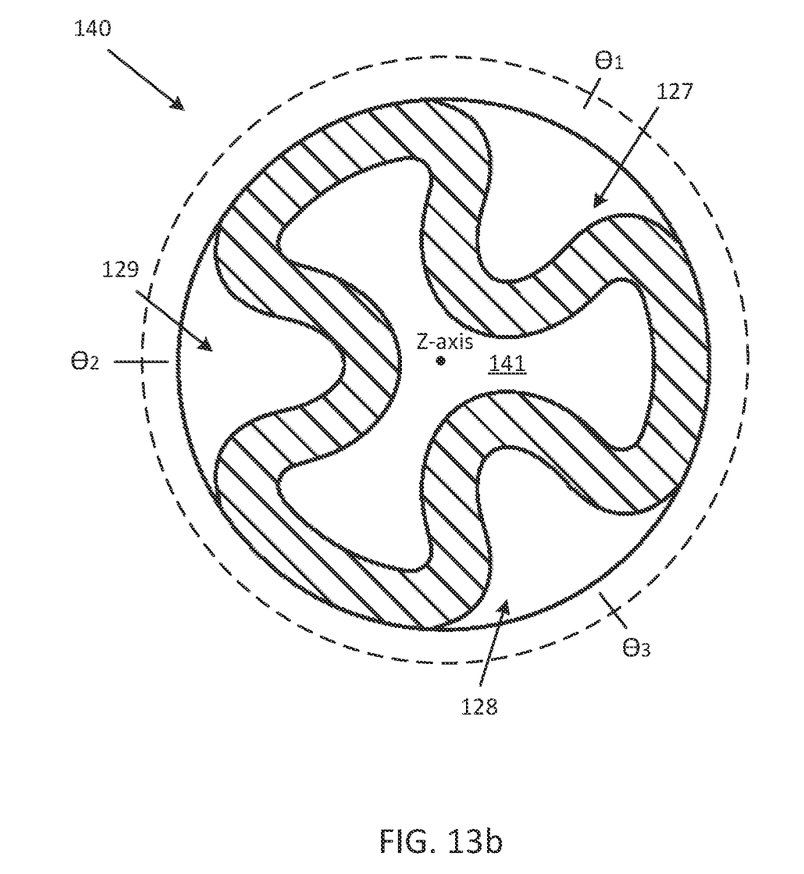
FIG. 13*b* shows a cross-sectional view of a portion of the filter according to an embodiment of the present disclosure.

FIGS. 13a and 13b show different views of the filter 121. For instance, FIG. 13a shows a perspective view of the filter 121 that includes the three indentations 127-129. FIG. 13b shows a cross-sectional view of a portion of the filter 121. Specifically, this figure shows a cross-section of the indentation section 11 along a transverse plane 140 to the Z-axis, as shown in FIG. 13a. In one embodiment, the indentations are entirely aligned with the transverse plane 140 such that the plane crosses through a midpoint of the indentation section (and midpoints of each of the indentations) and separates each of the indentations into equal halves. For instance, one half of indentation 127 is above the plane 140 and another half of indentation 127 is below the plane. Also shown in this figure, the indentation section includes a hollow interior 141 (or path) that is formed by each of the indentations. Thus, this interior 141 fluidly couples the chambers of the opposing receiving and smoke sections to one another. Also shown, the center longitudinal Z-axis intersects the hollow interior 141 such that no portion of the indentations are intersected by the Z-axis.

In one embodiment, each of the indentations are equidistant along a circumference of the tube filter. Specifically, segments or arch lengths between adjacent indentations are the same. This is also illustrated by the angle at which (e.g., a midpoint of) each of the indentations is positioned about the Z-axis. In this case, the angles may be equidistant about the Z-axis. For example, $\Theta_1$ of indentation 127 may be 45°, $\Theta_2$ of indentation 129 may be 180°, and $\Theta_3$ of indentation 128 may be 315°. In another embodiment, the angles may not be equidistant (e.g., a segment between indentation 129 and 128 may be shorter than a segment between indentation 129 and 127).

In some embodiments, the filter 121 may include more or less indentations. For example, the filter may include only two indentations that are aligned along the Z-axis and are 180° apart about the Z-axis. As another example, the filter may include four indentations.

In one embodiment, one or more operations performed in process 100 may be performed similarly or differently to manufacture filter 121. For example, to form the second and third indentation, the tube may be rotated about the Z-axis, and the heat and pressure may be applied at a same or similar point along the Z-axis, such that all (or some) of the indentations are aligned with one another.

As previously explained, an embodiment of the disclosure may be a non-transitory machine-readable medium (such as microelectronic memory) having stored thereon instructions, which program one or more data processing components (generically referred to here as a "processor") to perform the glass manufacturing operations of a vial manufacturing process. For instance, each of the processing operations disclosed herein may be performed by a single machine or a combination of machines, such that each of the steps are considered automated and capable of being performed without user intervention. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A tube filter for smoking a smokable substance, the tube filter comprising:
    a receiving section having a receiving chamber dimensioned to receive the smokable substance;
    a smoke section having a smoke chamber to output smoke produced while the smokable substance is ignited, wherein the smoke section has a first open end into the smoke chamber and the receiving section has a second open end into the receiving chamber that is opposite to the first end; and
    an indentation section that is disposed between the receiving section and the smoke section and fluidly couples the receiving section to the smoke section, wherein the indentation section includes a first indentation, a second indentation, and a third indentation that are entirely aligned along a transverse plane to a center longitudinal axis of the tube filter, wherein each said indentation extends from an outer surface of said tube filter into an interior portion of said tube filter.

2. The tube filter of claim 1, wherein the first, second, and third indentations are equidistant along a circumference of the tube filter.

3. The tube filter of claim 1, wherein each of the indentations are concave portions of a wall of the tube filter.

4. The tube filter of claim 3, wherein each of the concave portions have a same size.

5. The tube filter of claim 3, wherein at least one of the concave portions is a different size than a size of another one of the concave portions.

6. The tube filter of claim 1, wherein the center longitudinal axis intersects a hollow interior such that no portion of the first, second, or third indentations are intersected by the center longitudinal axis.

7. The tube filter of claim 1, wherein the tube filter is composed of at least one of metal and glass.

8. The tube filter of claim 1, wherein the smoke section has a first length that extends along the center longitudinal axis and the receiving section has a second length that extends along the center longitudinal axis, wherein the first length is less than the second length.

9. The tube filter of claim 1, wherein the receiving section tapers inward along the center longitudinal axis.

* * * * *